(12) United States Patent
Lee et al.

(10) Patent No.: US 10,980,021 B2
(45) Date of Patent: Apr. 13, 2021

(54) METHOD AND DEVICE FOR RECEIVING DOWNLINK SIGNAL IN WIRELESS COMMUNICATION SYSTEM

(71) Applicant: LG Electronics Inc., Seoul (KR)

(72) Inventors: Hyunho Lee, Seoul (KR); Kyuhwan Kwak, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/612,669

(22) PCT Filed: May 15, 2018

(86) PCT No.: PCT/KR2018/005554
§ 371 (c)(1),
(2) Date: Nov. 11, 2019

(87) PCT Pub. No.: WO2018/212557
PCT Pub. Date: Nov. 22, 2018

(65) Prior Publication Data
US 2020/0120668 A1    Apr. 16, 2020

Related U.S. Application Data

(60) Provisional application No. 62/655,739, filed on Apr. 10, 2018, provisional application No. 62/651,242, (Continued)

(30) Foreign Application Priority Data

Apr. 5, 2018    (KR) .................. 10-2018-0039926

(51) Int. Cl.
*H04J 3/00*        (2006.01)
*H04W 72/04*    (2009.01)
(Continued)

(52) U.S. Cl.
CPC ....... *H04W 72/0446* (2013.01); *H04L 1/1887* (2013.01); *H04L 5/0055* (2013.01); *H04W 72/042* (2013.01); *H04W 72/085* (2013.01)

(58) Field of Classification Search
CPC .......... H04W 72/0446; H04W 72/042; H04W 72/085; H04W 72/04; H04L 5/005; H04L 1/1887; H04L 1/18; H04L 5/00
See application file for complete search history.

(56) References Cited

U.S. PATENT DOCUMENTS 9,258,826 B2    2/2016  Lee et al.
2012/0127948 A1  5/2012  Chung et al.
(Continued)

FOREIGN PATENT DOCUMENTS

JP    2016040941    3/2013
KR   10-1444447    10/2014
(Continued)

OTHER PUBLICATIONS

Ericsson, "Physical layer aspects of short TTI for downlink transmissions," R1-160934, 3GPP TSG RAN WG1 Meeting #84, Malta, Feb. 15-19, 2016, 4 pages.
(Continued)

*Primary Examiner* — Abdelnabi O Musa
(74) *Attorney, Agent, or Firm* — Fish & Richardson P.C.

(57) ABSTRACT

A method for receiving a downlink signal in a wireless communication system according to an embodiment of the present invention is performed by a terminal, and may comprise the steps of: receiving, from a base station, a dynamic change configuration into a predetermined transmission scheme related to a short transmission time interval (sTTI)-based downlink operation; when the dynamic change configuration is received, detecting a downlink control information format including a field related to the dynamic (Continued)

change; and when a value of the field indicates the predetermined transmission scheme, receiving a signal on a downlink data channel according to the predetermined transmission scheme.

20 Claims, 7 Drawing Sheets

Related U.S. Application Data filed on Apr. 1, 2018, provisional application No. 62/571,266, filed on Oct. 12, 2017, provisional application No. 62/506,563, filed on May 15, 2017.

(51) Int. Cl.
    *H04L 1/18*      (2006.01)
    *H04L 5/00*      (2006.01)
    *H04W 72/08*     (2009.01)

(56) References Cited

U.S. PATENT DOCUMENTS

| | | | | |
|---|---|---|---|---|
| 2018/0098235 | A1* | 4/2018 | Bagheri | H04W 72/0446 |
| 2018/0227907 | A1* | 8/2018 | Hosseini | H04W 72/1205 |
| 2019/0098622 | A1* | 3/2019 | Lee | H04W 72/0446 |
| 2019/0238278 | A1* | 8/2019 | Dudda | H04L 5/0055 |
| 2019/0356426 | A1* | 11/2019 | He | H04L 1/1822 |
| 2020/0100278 | A1* | 3/2020 | Li | H04W 72/042 |

FOREIGN PATENT DOCUMENTS

| | | |
|---|---|---|
| KR | 101444447 | 10/2014 |
| WO | WO2009126902 | 10/2009 |
| WO | WO2016153137 | 9/2016 |
| WO | WO2017018758 | 2/2017 |
| WO | WO2017078372 | 5/2017 |

OTHER PUBLICATIONS

LG Electronics, "Discussion on configuration for shortened processing time in 1ms TTI," R1-1707533, 3GPP TSG RAN WG1 Meeting #89, Hangzhou, China May 15-19, 2017, 3 pages.

CMCC, "Discussion on downlink control monitoring resources design for sTTI," R1-1705109, 3GPP TSG RAN WG1 Meeting #88b, 3GPP TSG RAN WG1 Meeting #88b, dated Apr. 3-7, 2017, 4 pages.

Ericsson, "Physical layer aspects of short TTI for downlink transmissions," R1-160934, 3GPP TSG RAN WG1 Meeting #84, Malta, dated Feb. 15-19, 2016, 4 pages.

Intel Corporation, "sPUCCH resource allocation for sTTI," R1-1704678, 3GPP TSG-RAN WG1 #88bis, Spokane, USA, dated Apr. 3-7, 2017, 2 pages.

LG Electronics, "Discussion on configuration for shortened processing time in 1ms TTI," R1-1707533, 3GPP TSG RAN WG1 Meeting #89, Hangzhou, China, dated May 15-19, 2017, 3 pages.

LG Electronics, "Discussion on HARQ-ACK feedback method for NR," R1-1704917, 3GPP TSG RAN WG1 Meeting #88bis, Spokane, USA, dated Apr. 3-7, 2017, 7 pages.

Nokia, Alcatel-Lucent Shanghai Bell, "On details of short PDSCH design," R1-1704808, 3GPP TSG-RAN WG1 Meeting #88bis, Spokane, USA, dated Apr. 3-7, 2017, 6 pages.

NTT Docomo, Inc., "s(E)PDCCH for shortened TTI," R1-1610045, 3GPP TSG RAN WG1 Meeting #86bis, Lisbon, Portugal, dated Oct. 10-14, 2016, 8 pages.

PCT International Search Report and Written Opinion in International Application No. PCT/KR2018/005554, dated Sep. 21, 2018, 21 pages (with English translation).

Qualcomm Incorporated, "sTTI Operation," R1-1611637, 3GPP TSG RAN WG1 #87, Reno, Nevada, USA, dated Oct. 14-18, 2016, 6 pages.

ZTE, ZTE Microelectronics, "Simultaneous transmission in sTTI," R1-1704638, 3GPP TSG RAN WG1 Meeting #88bis, Spokane, USA, dated Apr. 3-7, 2017, 7 pages.

ZTE, ZTE Microelectronics, "Some issues in 1ms TTI with shortened processing time," R1-1609339, 3GPP TSG RAN WG1 Meeting #86bis, Lisbon, Portugal, dated Oct. 10-14, 2016, 7 pages.

Ericsson, "Design aspects of sPDSCH," R1-1611521, 3GPP TSG-RAN WG1 #87, Reno, USA, dated Nov. 14-18, 2016, 4 pages, XP51175498.

Ericsson, "On dynamic switching between 1ms TTI and sTTI," R1-1708860, 3GPP TSG-RAN WG1 Meeting #89, Hangzhou, P.R. China, dated May 15-19, 2017, 7 pages, XP051274043.

Ericsson, "On sTTI scheduling options," R1-1708861, 3GPP TSG-RAN WG1 Meeting #89, Hangzhou, P.R. China, dated May 15-19, 2017, 9 pages, XP051274044.

Extended European Search Report in European Application No. 18802459.0, dated Jun. 22, 2020, 11 pages.

Korean Notice of Allowance in Korean Application No. 10-2019-0034875, dated May 26, 2020, 5 pages (with English translation).

MediaTek Inc., "sPDCCH multiplexing with data," R1-1705460, 3GPP TSG RAN WG1 Meeting #88bis, Spokane, USA, dated Apr. 3-7, 2017, 3 pages.

NTT Docomo, Inc., "sPDCCH for shortened TTI," R1-167368, 3GPP TSG RAN WG1 Meeting #86, Gothenburg, Sweden, dated Aug. 22-26, 2016, 8 pages.

Spreadtrum Communications, "HARQ feedback for sTTI scheduling," R1-164584, 3GPP TSG RAN WG1 Meeting #85, Nanjing, China, dated May 23-27, 2016, 3 pages, XP051096891.

Ericsson, "DCI for sTTI scheduling," R1-1717161, 3GPP TSG-RAN WG1 Meeting #90bis, Prague, Czech Republic, dated Oct. 9-13, 2017, 4 pages.

Huawei, HiSilicon, "Number of HARQ processes," R1-1708153, 3GPP TSG RAN WG1 Meeting #89, Hangzhou, China, dated May 15-19, 2017, 5 pages.

Intel Corporation, "Discussion on DCI formats for sTTI scheduling," R1-1717320, 3GPP TSG-RAN WG1 #90bis, Prague, Czechia, dated Oct. 9-13, 2017, 4 pages.

Japanese Office Action in Japanese Application No. 2019-559687, dated Aug. 4, 2020, 6 pages (with English translation).

IN Office Action in Indian Appln. No. 201927041800, dated Dec. 24, 2020, 7 pages (with English translation).

JP Office Action in Japanese Appln. No. 2019-559687, dated Jan. 19, 2021, 8 pages (with English translation).

Nokia, Nokia Shanghai Bell, "Changes on PDSCH procedures in 36.213," R1-1801859, 3GPP TSG RAN WG1 Meeting #92, Athens, Greece, dated Feb. 26-Mar. 2, 2018, 4 pages.

\* cited by examiner (a) 2 symbol TTI DL structure (b) 3 symbol TTI DL structure (c) 4 symbol TTI DL structure (d) 7 symbol TTI DL structure (a) <3,2,2,2,2,3> sTTI pattern (b) <2,3,2,2,2,3> sTTI pattern

METHOD AND DEVICE FOR RECEIVING DOWNLINK SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2018/005554, filed on May 15, 2018, which claims the benefit of U.S. Provisional Application No. 62/655,739, filed on Apr. 10, 2018, Korean Application No. 10-2018-0039926, filed on Apr. 5, 2018, U.S. Provisional Application No. 62/651,242, filed on Apr. 1, 2018, U.S. Provisional Application No. 62/571,266, filed on Oct. 12, 2017, and U.S. Provisional Application No. 62/506,563, filed on May 15, 2017. The disclosures of the prior applications are incorporated by reference in their entirety.

TECHNICAL FIELD

The present disclosure relates to a wireless communication system, and more particularly, to a method and apparatus for receiving a downlink signal, which support a plurality of transmission time intervals (TTIs), a plurality of processing times, or a plurality of numerologies.

BACKGROUND ART

The latency of packet data is one of important performance metrics. To reduce the latency of packet data and provide faster Internet access to end users is one of challenging issues in designing the next-generation mobile communication system called new radio access technology (new RAT) as well as long term evolution (LTE).

The present disclosure is intended to deal with downlink signal reception or transmission techniques in a wireless communication system supporting latency reduction.

DISCLOSURE

Technical Problem

The present disclosure relates to downlink reception at a user equipment (UE) with a plurality of transmission time intervals (TTIs), a plurality of processing times, or a plurality of numerologies in a carrier aggregation (CA) system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method for receiving downlink signals in a wireless communication, the method performed by a terminal, includes receiving, from a base station, a configuration of dynamic change to a predetermined transmission scheme related to a short transmission time interval (sTTI)-based downlink operation, when receiving the configuration of the dynamic change, detecting a downlink control information format including a field related to the dynamic change, and when a value of the field indicates the predetermined transmission scheme, receiving signals on a downlink data channel according to the predetermined transmission scheme.

Additionally or alternatively, the configuration of the dynamic change may be configured per transmission time interval (TTI) length.

Additionally or alternatively, the configuration of the dynamic change may be configured irrespective of a transmission mode related to the sTTI-based downlink operation.

Additionally or alternatively, the predetermined transmission scheme may be transmit diversity.

Additionally or alternatively, the method may further include reporting, to the base station, a terminal capability as to whether the dynamic change to the predetermined transmission scheme is supported.

Additionally or alternatively, the terminal capability reporting may be defined per TTI length.

Additionally or alternatively, the downlink control information format may schedule downlink data channels in a plurality of TTIs, and hybrid automatic repeat request (HARQ)-acknowledgment (ACK) responses for the downlink data channels in the plurality of TTIs may be transmitted individually at timings corresponding to the respective downlink channels in the plurality of TTIs.

Additionally or alternatively, the downlink control information format may schedule downlink data channels in a plurality of TTIs, and HARQ-ACK responses for the downlink channels in the plurality of TTIs may be transmitted by bundling or aggregation.

Additionally or alternatively, the HARQ-ACK responses may be transmitted in resources determined by a lowest control channel element (CCE) index of the downlink control information format or resources spaced from resources linked to states of an ACK/NACK resource indicator (ARI) field by a predetermined offset.

Additionally or alternatively, a resource block set for monitoring the downlink control information format, an aggregation level to be used in the resource block set for monitoring the downlink control information format, and/or the number of monitoring candidates may be configured.

In another aspect of the present disclosure, a terminal for receiving downlink signals in a wireless communication system includes a receiver and transmitter, and a processor configured to control the receiver and the transmitter. The processor is configured to receive, from a base station, a configuration of dynamic change to a predetermined transmission scheme related to an sTTI-based downlink operation, when receiving the configuration of the dynamic change, detect a downlink control information format including a field related to the dynamic change, and when a value of the field indicates the predetermined transmission scheme, receive signals on a downlink data channel according to the predetermined transmission scheme.

Additionally or alternatively, the configuration of the dynamic change may be configured on a TTI basis.

Additionally or alternatively, the configuration of the dynamic change may be configured irrespective of a transmission mode related to the sTTI-based downlink operation.

Additionally or alternatively, the predetermined transmission scheme may be transmit diversity.

Additionally or alternatively, the processor may be configured to report, to the base station, a terminal capability as to whether the dynamic change to the predetermined transmission scheme is supported.

Additionally or alternatively, the terminal capability reporting may be defined on a TTI length basis.

Additionally or alternatively, the downlink control information format may schedule downlink data channels in a plurality of TTIs, and HARQ-ACK responses for the downlink data channels in the plurality of TTIs may be transmitted individually at timings corresponding to the respective downlink channels in the plurality of TTIs.

Additionally or alternatively, the downlink control information format may schedule downlink data channels in a plurality of TTIs, and HARQ-ACK responses for the downlink channels in the plurality of TTIs may be transmitted by bundling or aggregation.

Additionally or alternatively, the HARQ-ACK responses may be transmitted in resources determined by a lowest CCE index of the downlink control information format or resources spaced from resources linked to states of an ACK/NACK resource indicator (ARI) field by a predetermined offset.

Additionally or alternatively, a resource block set for monitoring the downlink control information format, an aggregation level to be used in the resource block set for monitoring the downlink control information format, and/or the number of monitoring candidates may be configured.

The above technical solutions are merely some parts of the examples of the present disclosure and various examples into which the technical features of the present disclosure are incorporated can be derived and understood by persons skilled in the art from the following detailed description of the present disclosure.

Advantageous Effects

According to the examples of the present disclosure, downlink reception may be efficiently performed.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure, illustrate examples of the disclosure and together with the description serve to explain the principle of the disclosure.

BEST MODE FOR CARRYING OUT THE INVENTION

Figure 1:
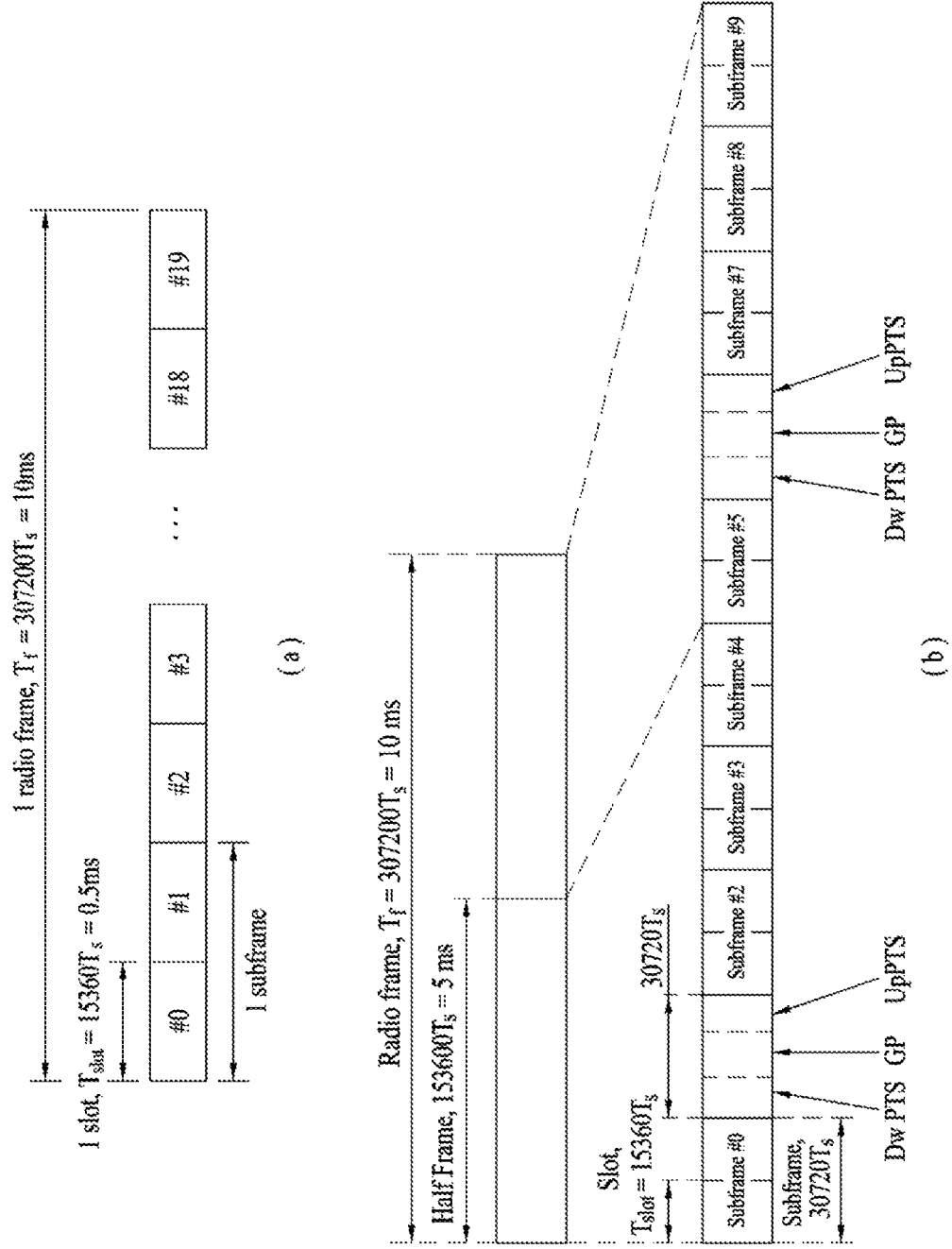
FIG. 1 illustrates the structure of a radio frame used in a wireless communication system.

Reference will now be made in detail to the exemplary examples of the present disclosure, examples of which are illustrated in the accompanying drawings. The detailed description, which will be given below with reference to the accompanying drawings, is intended to explain exemplary examples of the present disclosure, rather than to show the only examples that can be implemented according to the disclosure. The following detailed description includes specific details in order to provide a thorough understanding of the present disclosure. However, it will be apparent to those skilled in the art that the present disclosure may be practiced without such specific details.

In some instances, known structures and devices are omitted or are shown in block diagram form, focusing on important features of the structures and devices, so as not to obscure the concept of the present disclosure. The same reference numbers will be used throughout this specification to refer to the same or like parts.

In the present disclosure, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present disclosure, a BS will be referred to as an eNB.

In the present disclosure, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna. A node is also referred to as a point. Compared to a conventional centralized antenna system (CAS) (i.e., a single-node system) in which antennas are concentrated in an eNB and controlled by one eNB controller, a plurality of nodes are generally located apart from each other by a predetermined distance or larger in a multi-node system. The plurality of nodes may be managed by one or more eNBs or eNB controllers which schedule data to be transmitted/received through each node. Each node may be connected to an eNB or eNB controller managing the node by cable or a dedicated line. In the multi-node system, the same or different cell identifies (IDs) may be used for signal transmission/reception to/from the plurality of nodes. If the plurality of nodes has the same cell ID, each of the nodes operates as a set of some antennas in one cell. If the nodes have different cell IDs in the multi-node system, this multi-node system may be regarded as a multi-cell (e.g., macro-cell/pemto-cell/pico-cell) system. If multiple cells formed by the plurality of nodes, respectively are overlaid with each other according to their coverages, a network constructed with the multiple cells is called a multi-tier network. The cell ID of an RRH/RRU and the cell ID of an eNB may be the same or different. If the RRH/RRU and the eNB use different cell IDs, both of the RRH/RRU and the eNB operate as independent BSs.

In a multi-node system of the present disclosure as described below, one or more eNBs or eNB controllers connected to a plurality of nodes may control the nodes to enable all or a part of the nodes to simultaneously transmit or receive signals to and from a UE. Although there are differences between multi-node systems in terms of the entity and implementation of each node, the multi-node systems are also different from a single-node system (e.g., a CAS, a legacy MIMO system, a legacy relay system, a legacy repeater system, or the like) in that a plurality of nodes participate together in providing a communication service to a UE in predetermined time-frequency resources. Accordingly, examples of the present disclosure pertaining to a method of performing data cooperative transmission by means of all or a part of a plurality of nodes are applicable to various types of multi-node systems. For example, while a node generally refers to an antenna group apart from another node by a predetermined distance or larger, the following examples of the present disclosure are also applicable even when a node refers to any antenna group irrespective of the distance between nodes. For example, for an eNB including X-pol (cross-polarized) antennas, the examples of the present disclosure may be applied with the appreciation that the eNB controls a node with H-pol antennas and a node with V-pol antennas.

A communication technique in which signals are transmitted/received through a plurality of transmission (Tx)/reception (Rx) nodes, signals are transmitted/received through at least one node selected from a plurality of Tx/Rx nodes, or a node transmitting a DL signal is different from a node receiving a UL signal is called multi-eNB MIMO or coordinated multi-point Tx/Rx (CoMP). Among these schemes for cooperative communication between nodes, cooperative transmission schemes are largely classified into joint processing (JP) and scheduling coordination. JP may further be classified into joint transmission (JT)/joint reception (JR) and dynamic point selection (DPS), whereas scheduling coordination may further be classified into coordinated scheduling (CS) and coordinated beamforming (CB). DPS is also referred to as dynamic cell selection (DCS). Compared to the cooperative communication schemes, when JP is performed among cooperative communication schemes between nodes, various communication environments may be formed. Among the JP schemes, a plurality of nodes transmits the same streams to a UE in JT, and a plurality of nodes receive the same stream from a UE in JR. The UE/eNB recovers the stream by combining the received signals. In view of transmission of the same stream from/to a plurality of nodes in JT/JR, the reliability of signal transmission may be increased by transmit diversity. Among the JP schemes, DPS is a communication scheme in which a signal is transmitted/received through a node selected from among a plurality of nodes according to a specific rule. Because a node in a good channel state for a UE is generally selected, DPS may increase the reliability of signal transmission.

In the present disclosure, a cell refers to a prescribed geographical area to which one or more nodes provide a communication service. Accordingly, in the present disclosure, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using channel state information reference signal(s) (CSI-RS(s)) transmitted on a CSI-RS resource, allocated by antenna port(s) of the specific node to the specific node. In general, adjacent nodes transmit CSI-RSs in mutually orthogonal CSI-RS resources. When it is said that CSI-RS resources are orthogonal, the CSI resources are different in terms of at least one of a CSI-RS resource configuration which specifies a symbol and a subcarrier carrying a CSI-RS, a subframe configuration which specifies a subframe to which a CSI-RS is allocated by a subframe offset and a transmission period, or a CSI-RS sequence.

In the present disclosure, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present disclosure, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present disclosure, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

FIG. 1 illustrates the structure of a radio frame used in a wireless communication system. Specifically, FIG. 1(a) illustrates an exemplary structure of a radio frame which be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configu- ration | Downlink- to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

Figure 2:
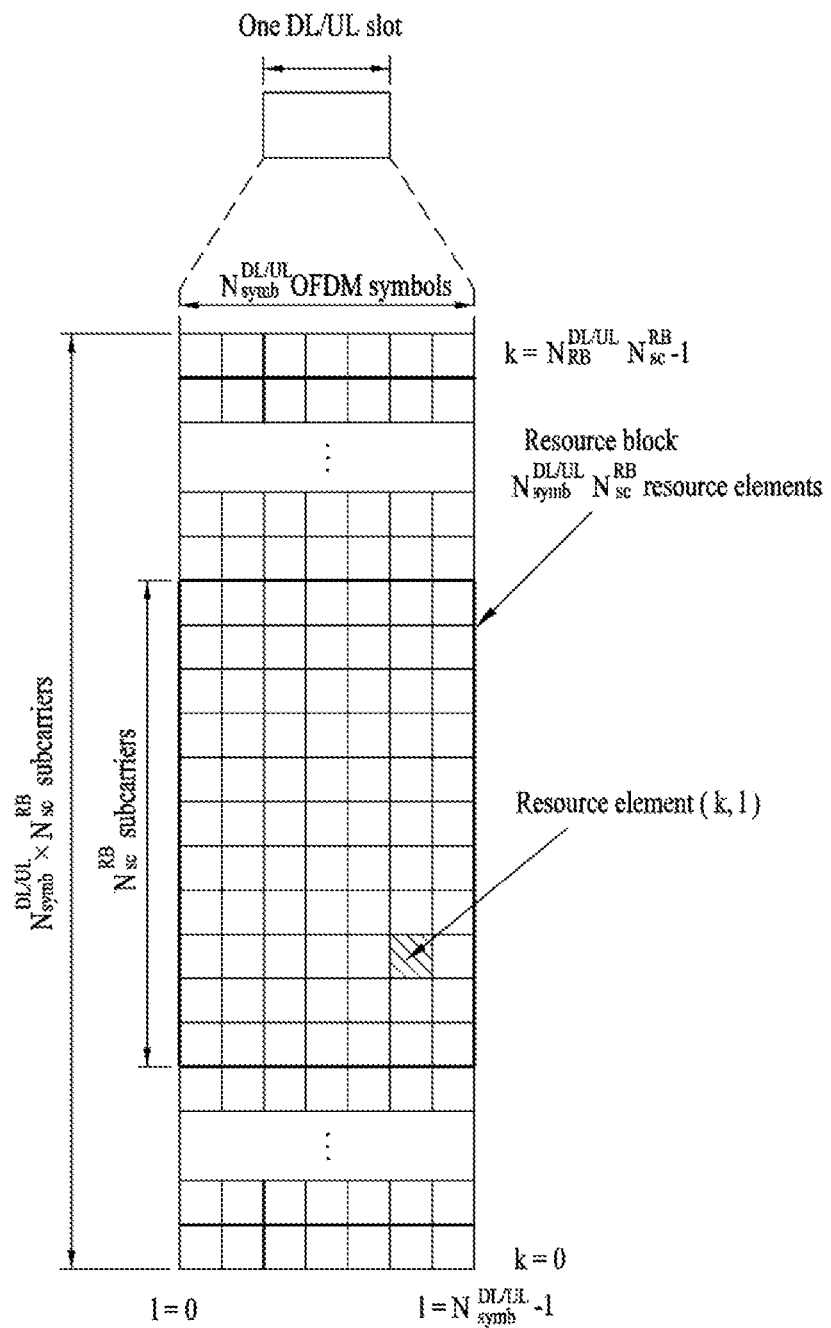
FIG. 2 illustrates the structure of a downlink (DL)/uplink (UL) slot in a wireless communication system.

FIG. 2 illustrates the structure of a DL/UL slot structure in a wireless communication system. Particularly, FIG. 2 illustrates the structure of a resource grid in the 3GPP LTE/LTE-A system. There is on resource grid per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{DL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, examples of the present disclosure are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}-1$ in the time domain.

Two RBs each being located in one of two slots in a subframe, occupying the same $N^{RB}_{sc}$ consecutive subcarriers are referred to as a physical resource block (PRB) pair. The two RBs of a PRB pair have the same PRB number (or PRB index). A virtual resource block (VRB) is a kind of logical resource allocation unit introduced for resource allocation. A VRB is of the same size as a PRB. VRBs are categorized into localized VRBs and distributed VRBs depending on how VRBs are mapped to PRBs. The localized VRBs are mapped directly to PRBs, and thus VRB numbers (or VRB indexes) correspond directly to PRB numbers. That is, $n_{PRB}=n_{VRB}$. The localized VRBs are indexed as 0 to $N^{DL}_{VRB}-1$, and $N^{DL}_{VRB}=N^{DL}_{RB}$. Accordingly, VRBs of the same VRB number are mapped to PRBs of the same PRB number in the first and second slots in the localized mapping scheme. In contrast, distributed VRBs are mapped to PRBs after interleaving. Accordingly, distributed VRBs of the same VRB number may be mapped to PRBs of different numbers in the first and second slots. Two PRBs of the same VRB number, each being located in one of two slots in a subframe are referred to as a VRB pair.

Figure 3:
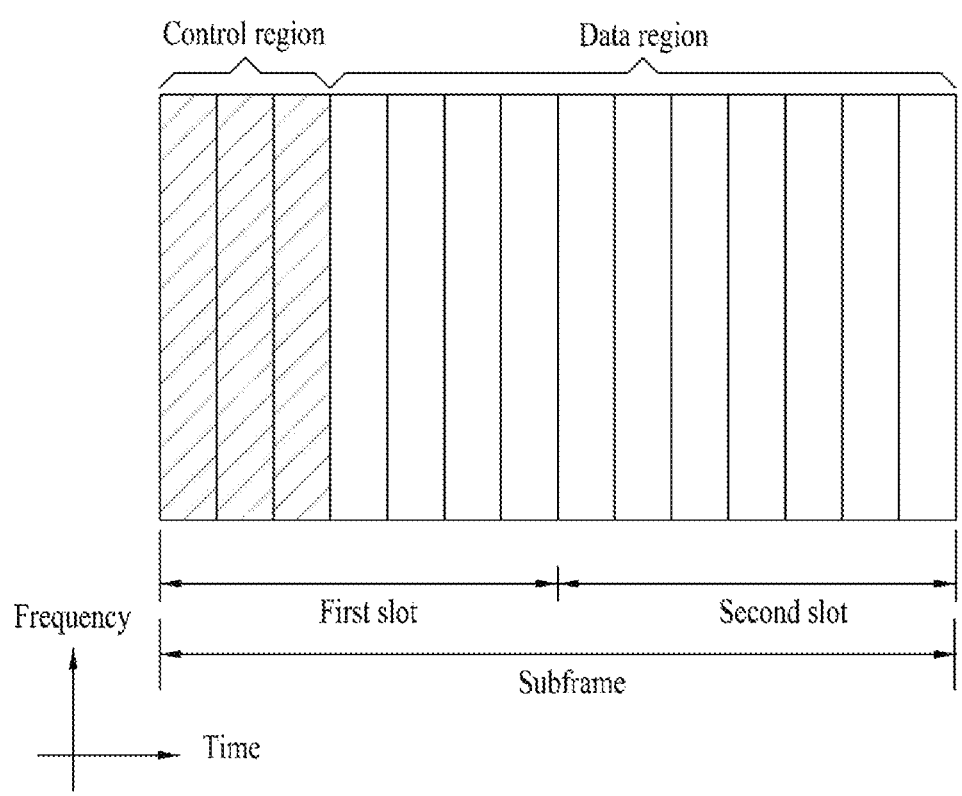
FIG. 3 illustrates the structure of a DL subframe used in a $3^{rd}$ generation partnership project long term evolution (3GPP LTE)/LTE-advanced (LTE-A) system.

FIG. 3 illustrates the structure of a DL subframe used in the 3GPP LTE/LTE-A system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. For example, the DCI includes a transmission format and resource allocation information for a downlink shared channel (DL-SCH), a transmission format and resource allocation information for an uplink shared channel (UL-SCH), paging information of a paging channel (PCH), system information of the DL-SCH, resource allocation information for an upper-layer control message such as a random access response transmitted on a PDSCH, a transmit power control command set for individual UEs of a UE group, a transmit power control command, indication information for activation of voice over IP (VoIP), a downlink assignment index (DAI), and so on. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to 9 REGs, and one REG corresponds to four REs. In a 3GPP LTE system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs. In the 3GPP LTE/LTE-A system, SSs for respective DCI formats may have different sizes, and a dedicated SS and a common SS are defined. The dedicated SS is a UE-specific SS (USS) and is configured for each individual UE. The common SS (CSS) is configured for a plurality of UEs. In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs, where a search space $S^{(L)}_k$ at aggregation level $L \in \{1,2,4,8\}$ is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

TABLE 3

| | Search Space $S_K^{(L)}$ | | |
| --- | --- | --- | --- |
| Type | Aggregation Level L | Size [in CCEs] | Number of PDCCH candidates $M^{(L)}$ |
| UE-specific | 1 | 6 | 6 |
| | 2 | 12 | 6 |

TABLE 3-continued

| | Search Space $S_k^{(L)}$ | | |
|---|---|---|---|
| Type | Aggregation Level L | Size [in CCEs] | Number of PDCCH candidates $M^{(L)}$ |
| | 4 | 8 | 2 |
| | 8 | 16 | 2 |
| Common | 4 | 16 | 4 |
| | 8 | 16 | 2 |

One PDCCH candidate corresponds to 1, 2, 4, or 8 CCEs according to a CCE aggregation level. An eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

The eNB may transmit data to a UE or UE group in a data region. Data transmitted in the data region is referred to as user data. For transmission of user data, a physical downlink shared channel (PDSCH) may be allocated in the data region. A paging channel (PCH) and a DL-SCH are transmitted on the PDSCH. A UE may read data transmitted on a PDSCH by decoding control information transmitted on a PDCCH. Information regarding a UE or UE group to which data of the PDSCH is transmitted, and information regarding how the UE or UE group should receive and decode the PDSCH data may be transmitted on the PDCCH. For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

To demodulate a signal received from the eNB, the UE needs a reference signal (RS) to be compared with a data signal. An RS is a signal in a predefined special waveform, which the eNB or the UE transmits to the UE or the eNB or which is known to both of the eNB and the UE. The RS is also called a pilot. RSs are classified into cell-specific RS (CRS) common to all UEs within a cell and demodulated RS (DM RS) dedicated to a specific UE. A DM RS that the eNB transmits for demodulation of DL data at a specific UE is specially called a UE-specific RS. Only one or both of the DM RS and the CRS may be transmitted on DL. However, when only the DM RS without the CRS is transmitted on the DL, the DM RS to which the same precoder as that for data is applied may be used only for demodulation. Therefore, an RS for channel measurement should be provided separately. For example, an additional measurement RS, CSI-RS is transmitted to the UE to enable the UE to measure channel state information (CSI) in 3GPP LTE(-A). Compared to the CRS transmitted in each subframe, the CSI-RS is transmitted in every predetermined transmission period including a plurality of subframes, based on the property that a channel state does not change relatively much over time.

Figure 4:
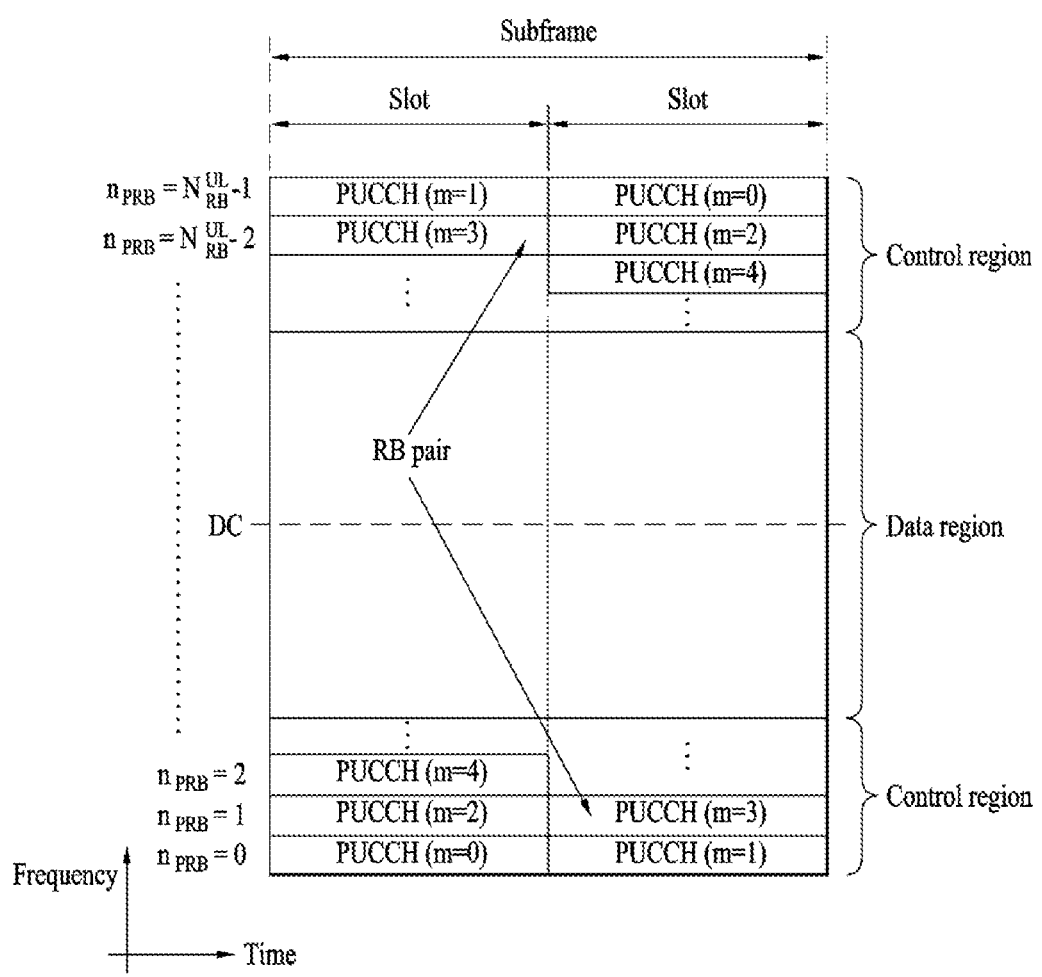
FIG. 4 illustrates the structure of a UL subframe used in the 3GPP LTE/LTE-A system.

FIG. 4 illustrates the structure of a UL subframe used in the 3GPP LTE/LTE-A system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. In the CSI, multiple input multiple output (MIMO) related feedback information includes the rank indicator (RI) and the precoding matrix indicator (PMI).

The amount of uplink control information (UCI) that the UE may transmit in a subframe depends on the number of SC-FDMA symbols available for transmission of control information. The SC-FDMA symbols available for the UCI refer to the remaining SC-FDMA symbols except for SC-FDMA symbols used for RS transmission in an SC-FDMA subframe, and also except for the last SC-FDMA symbol in a subframe with a sounding reference signal (SRS). The RS is used for coherent detection of a PUCCH. The PUCCH supports various formats according to the amount of transmitted information.

Table 4 illustrates mapping relationships between PUCCH formats and UCI in the LTE/LTE-A system.

TABLE 4

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, the PUCCH format 1 series are mainly used to deliver ACK/NACK information, the PUCCH format 2 series are mainly used to deliver channel state information (CSI) such as CQI/PMI/RI, and the PUCCH format 3 series are mainly used to deliver ACK/NACK information.

Reference Signal (RS)

When a packet is transmitted in a wireless communication system, the signal may be distorted during transmission because the packet is transmitted on a radio channel. To correctly receive the distorted signal, a receiver should compensate the received signal for the distortion based on channel information. Typically, a signal known to both the transmitter and the receiver is transmitted, and the channel information is obtained based on how much the signal is distorted during reception on the radio channel. This signal is called a pilot signal or a reference signal (RS).

When data is transmitted and received through multiple antennas, knowledge of the channel state between each transmission antenna and each reception antenna is required to receive a correct signal. Therefore, an RS should exist for each individual transmission antenna and more specifically for each individual antenna port.

RSs may be classified into UL RSs and DL RSs. In the current LTE system, the following UL RSs are defined.

i) Demodulation reference signal (DM-RS) for channel estimation for coherent demodulation of information transmitted over a PUSCH and a PUCCH ii) Sounding reference signal (SRS) in which an eNB measures UL channel quality in different frequencies.

The following DL RSs are defined.

i) Cell-specific reference signal (CRS) shared by all UEs within a cell.

ii) UE-specific reference signal dedicated to a specific UE.

iii) DM-RS transmitted for coherent demodulation, when a PDSCH is transmitted.

iv) Channel state information reference signal (CSI-RS) for delivering CSI, when DL DMRS is transmitted.

v) Multimedia broadcast single frequency network (MBSFN) RS transmitted for coherent demodulation of a signal transmitted in an MB SFN mode.

vi) Positioning reference signal used to estimate information about the geographical location of a UE.

RSs may be classified into two types according to their purposes: RS for obtaining channel information and RS for data demodulation. Because the former is used for a UE to acquire DL channel information, it should be transmitted over a wide band and received even at a UE which does not receive DL data in a specific subframe. The former is also used in a situation such as handover. The latter is an RS that an eNB transmits together with DL data in a corresponding resource, and a UE may demodulate data by receiving the RS and performing channel measurement. This RS should be transmitted in an area in which data is transmitted.

Carrier Aggregation (CA)

CA is a technique of using a plurality of frequency blocks or (logical) cells including UL resources (or component carriers (CCs) and/or DL resources (or CCs) as one large logical frequency band by a UE, so that a wireless communication system may use a wider frequency band.

One DL CC and one UL CC are used in the LTE system, whereas multiple CCs may be used in the LTE-A system. Two methods are available for scheduling a data channel by a control channel: link/self-carrier scheduling and cross-carrier scheduling (CCS).

More specifically, in the link/self-carrier scheduling, a control channel transmitted in a specific CC schedules only a data channel in the specific CC as in the legacy LTE system using a single CC.

On the other hand, in the cross-carrier scheduling, a control channel transmitted in a primary CC schedules a data channel transmitted in the primary CC or another CC by using a carrier indicator field (CIF).

Enhanced PDCCH (EPDCCH) Overview

Although the introduction of a multi-node system enables application of various communication schemes, and thus channel quality may be improved, the introduction of a new control channel is required to apply MIMO and CoMP as described before to a multi-node environment. In this context, enhanced PDCCH (EPDCCH) has been introduced to the LTE-A system. The EPDCCH is allocated in a data region, not in a control region of a transmission time interval (TTI) or a subframe. Consequently, the EPDCCH enables transmission of control information about a node to each UE, thereby overcoming the conventional problem of an insufficient PDCCH region.

In order to satisfy requirements for various application fields, it may be considered to configure various transmission time intervals (TTIs) (or various TTI lengths) for all or a specific physical channel in the next-generation system. More characteristically, a TTI during which a physical channel such as a PDCCH/PDSCH/PUSCH/PUCCH is transmitted may be set to be less than 1 msec to reduce latency for communication between an eNB and a UE according to a scenario (such a PDCCH/PDSCH/PUSCH/PUCCH is referred to as an sPDCCH/sPDSCH/sPUSCH/ sPUCCH). For a single UE or multiple UEs, a plurality of physical channels may exist in a single subframe (e.g., 1 msec), and have different TTIs (or TTI lengths). The following examples will be described in the context of an LTE system, for the convenience of description. A TTI may be 1 msec (normal TTI), the length of a normal subframe used in the LTE system, and a short TTI is a TTI shorter than the normal TTI, spanning one or more OFDM or SC-FDMA symbols. While a short TTI (i.e., a TTI shorter than a legacy one subframe) is taken for the convenience of description, the key features of the present disclosure may be extended to a TTI longer than one subframe or equal to or longer than 1 ms. Characteristically, the key features of the present disclosure may also be extended to a short TTI which is introduced to the next-generation system by increasing a subcarrier spacing. Although the present disclosure is described in the context of LTE, for convenience, it is applicable to a technology using a different waveform/frame structure such as new radio access technology (RAT). In general, the present disclosure is based on the assumption of an sTTI (<1 msec), a longTTI (=1 msec), and a longerTTI (>1 msec). While a plurality of UL channels having different TTI lengths/numerologies/processing times have been described above, it is apparent that the following examples may be extended to a plurality of UL/DL channels to which different service requirements, latencies, and scheduling units are applied.

Figure 5:
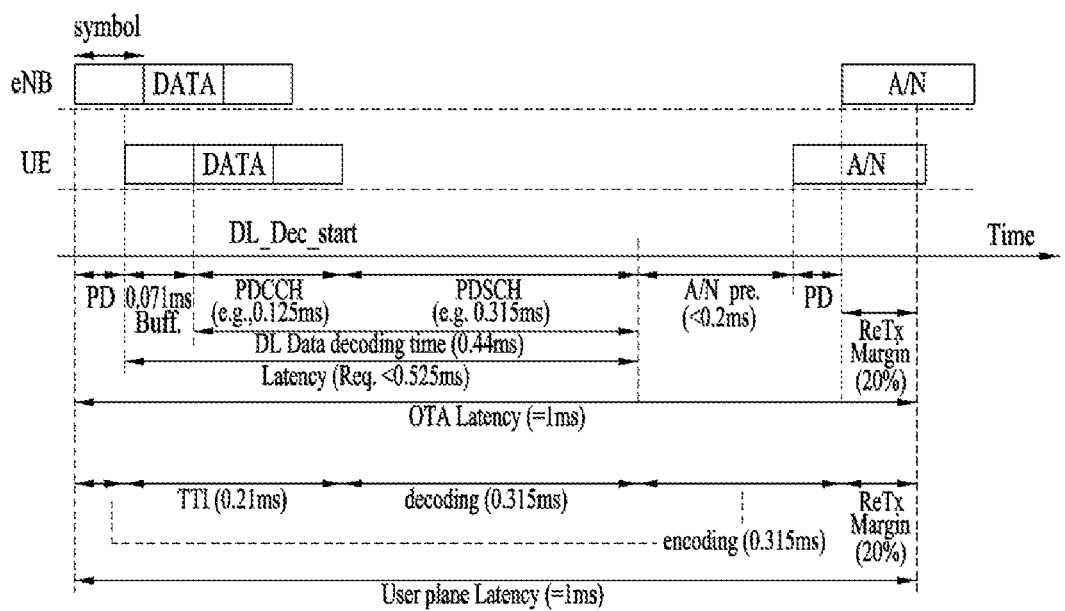
FIG. 5 illustrates reduction of a transmission time interval (TTI) length due to reduction of a user-plane latency.

To fulfill the above-described latency reduction, that is, low latency, there is a need for designing a new shortened TTI (sTTI) of 0.5 msec or less by shortening the minimum data transmission unit, TTI. For example, to reduce the user plane (U-plane) latency from the beginning of data (PDCCH and PDSCH) transmission from an eNB to complete transmission of an A/N (or ACK/NACK) from a UE to 1 msec as illustrated in FIG. 5, an sTTI may be configured in units of 3 OFDM symbols.

Figure 6:
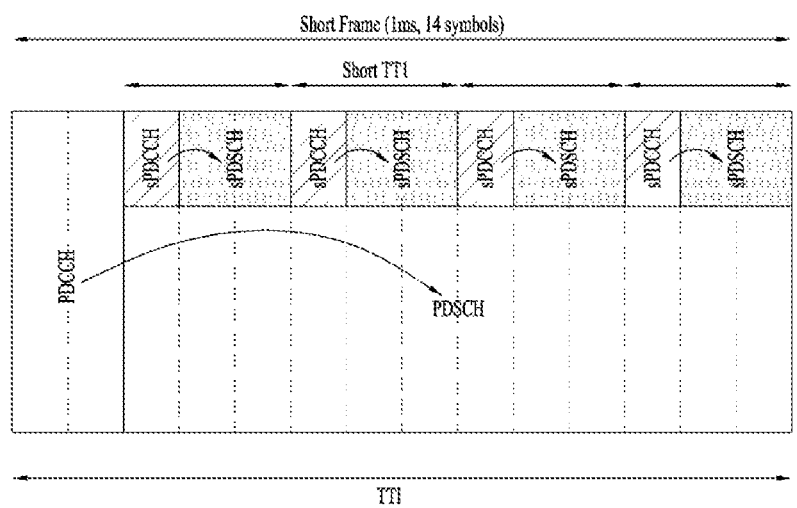
FIG. 6 illustrates an example of a plurality of shortened TTIs (sTTIs) configured in one subframe.

In a DL environment, a PDCCH (i.e., sPDCCH) designed for transmission/scheduling of data in an sTTI, and a PDSCH (i.e., sPDSCH) designed to be transmitted in an sTTI may be transmitted in such an sTTI. For example, as illustrated in FIG. 6, a plurality of sTTIs may be configured with different OFDM symbols in one subframe. Characteristically, OFDM symbols included in the sTTI may be configured to exclude OFDM symbols carrying legacy control channels. In the sTTI, an sPDCCH and an sPDSCH may be transmitted in time division multiplexing (TDM) in different OFDM symbol regions, or in frequency division multiplexing (FDM) in different PRB regions/frequency resources.

Like the above-described DL environment, data may be transmitted/scheduled in a sTTI in a UL environment, and channels corresponding to the existing TTI-based PUCCH and PUSCH are referred to as sPUCCH and sPUSCH.

Figure 7:
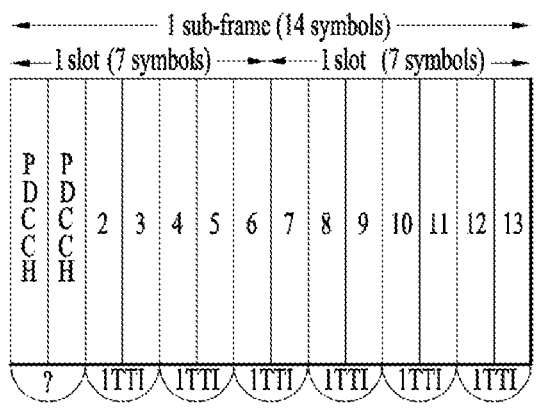
FIG. 7 illustrates the structures of DL subframes including sTTIs of a plurality of lengths (a plurality of numbers of symbols).
Figure 7:
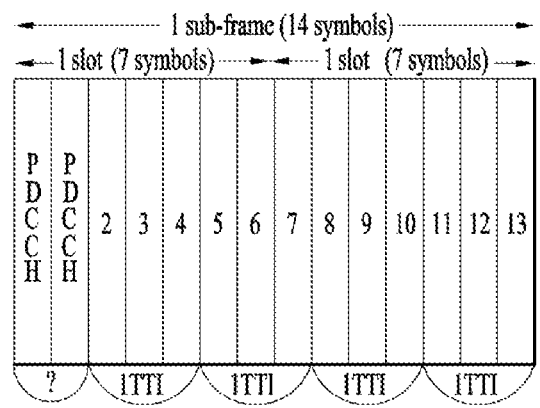
Figure 7:
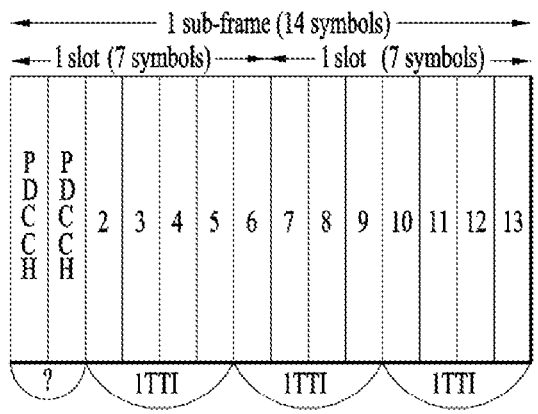
Figure 7:
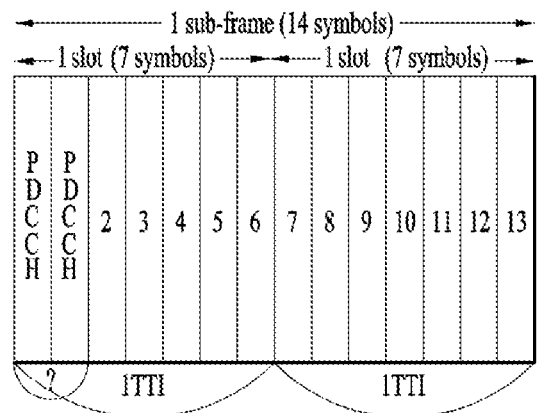

The present disclosure is described in the context of the LTE/LTE-A system. In the legacy LTE/LTE-A system, a 1-ms subframe includes 14 OFDM symbols in the case of a normal CP. When a TTI is configured to be shorter than 1 ms, a plurality of TTIs may be included in one subframe. In a method of configuring a plurality of TTIs, two symbols, three symbols, four symbols, and seven symbols may be configured as one TTI, as illustrated in FIG. 7. Although not shown, a TTI spanning one symbol may also be considered. If one symbol is one TTI unit, 12 TTIs are formed on the assumption that the legacy PDCCH is transmitted in two OFDM symbols. Similarly, as illustrated in FIG. 7A, when two symbols are one TTI unit, six TTIs may be formed. When three symbols are one TTI unit, four TTIs may be formed as illustrated in FIG. 7B. When four symbols are one TTI unit, three TTIs may be formed as illustrated in FIG. 7(c). In this case, it is assumed that the legacy PDCCH is transmitted in the first two OFDM symbols.

As illustrated in FIG. 7(d), when seven symbols are configured as one TTI, one TTI of seven symbols carrying the legacy PDCCH and one TTI of the next seven symbols may be configured. If one TTI is configured with seven symbols, a UE supporting sTTI may assume that the first two OFDM symbols carrying the legacy PDCCH have been punctured or rate-matched and the following five symbols carry data and/or control information for the UE in the TTI (first slot) located at the former part of one subframe. For the TTI (second slot) located in the latter part of the subframe, the UE assumes that data and/or control information may be transmitted in all of the seven symbols without any puncturing or rate-matching resource regions.

Figure 8:
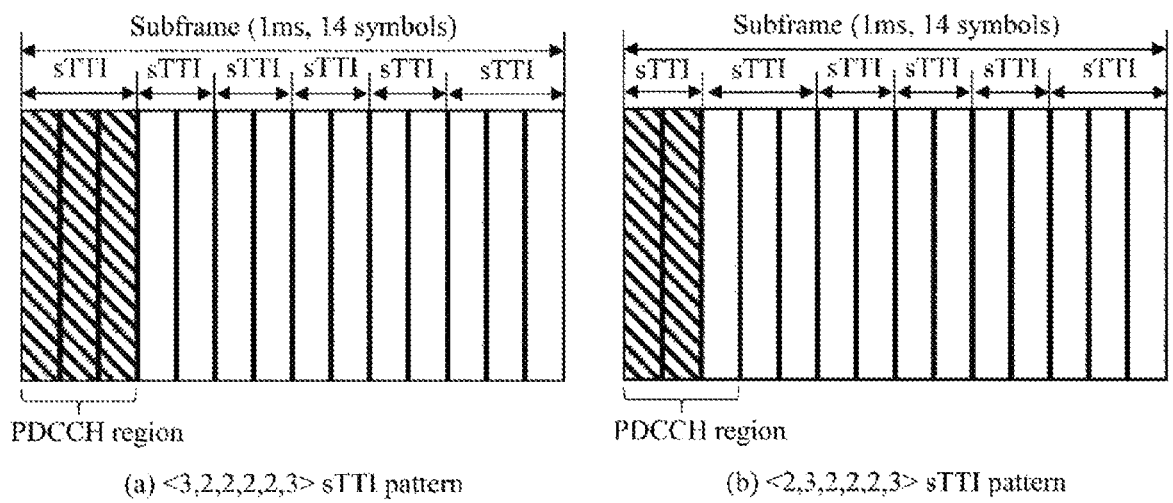
FIG. 8 illustrates the structures of DL subframes including 2-symbol or 3-symbol sTTIs.

In the present disclosure, an sTTI structure in which an sTTI spanning two OFDM symbols (hereinafter, referred to as "OSs") coexists with an sTTI spanning three OSs as illustrated in FIG. 8 is also considered. A 2-OS or 3-OS sTTI may be simply defined as a 2-symbol sTTI (i.e., a 2-OS sTTI). Further, a 2-symbol sTTI or 3-symbol sTTI may be referred to simply as a 2-symbol TTI or 3-symbol TTI. All of these sTTIs are shorter than the legacy 1-ms TTI according to the present disclosure. That is, despite the term "TTI", it does not mean that the TTI is not an sTTI, and the present disclosure relates to a communication scheme in a system configured with a TTI shorter than the legacy TTI, irrespective of the appellation.

Further, in the present disclosure, a numerology refers to determining the length of a TTI, a subcarrier spacing, and so on to be applied to the wireless communication system, a parameter such as a determined TTI length or subcarrier spacing, or a communication structure or system based on the parameter.

In the <3,2,2,2,2,3> sTTI pattern illustrated in FIG. 8(a), an sPDCCH may also be transmitted according to the number of symbols in a PDCCH. In the <2,3,2,2,2,3> sTTI pattern illustrated in FIG. 8(b), transmission of an sPDCCH may be difficult because of the legacy PDCCH region.

New Radio Technology (NR)

While the structure, operation, or function of the 3GPP LTE(-A) system has been described above, the structure, operation, or function of the 3GPP LTE(-A) system may be slightly modified or implemented in other ways in NR. Some of the modifications and implementations will be briefly described.

In NR, various numerologies are supported. For example, a subcarrier spacing of up to a 2" multiple of 15 KHz (n=1, 2, 3, 4) as well as a subcarrier spacing of 15 KHz is supported.

Further, in the case of a normal CP, although the number of OFDM symbols (hereinafter, simply referred to as "symbols") per slot is fixed to 14, the supported number of slots in one subframe is up to $2^k$ (k=0, 1, 2, 3, 4, and 5) and a radio frame includes 10 subframes as in the legacy LTE system. In the case of an extended CP, the number of symbols per slot is fixed to 12, and one subframe includes 4 slots. Further, one resource block (RB) is defined as 12 consecutive subcarriers in the frequency domain, as in the legacy LTE system.

Further, the use (e.g., DL, UL, or flexible) of each symbol in one slot may be defined according to a slot format, and both a DL symbol and a UL symbol may be configured in one slot. This case is referred to as a self-contained subframe (or slot) structure.

Multi-TTI Scheduling

As a method of reducing latency, it is considered to define and transmit a shorter TTI. For example, it is considered to define a PDSCH and a PUSCH having a 2-symbol or 3-symbol sTTI and transmit/receive DL data on the PDSCH and UL data on the PUSCH. However, this method may increase control overhead because a control channel for scheduling should also be transmitted in each TTI. As one solution to this problem, multi-TTI scheduling may be considered, in which one control channel schedules a plurality of TTIs. When multi-TTI scheduling is considered, the following is proposed.

HARQ-ACK Resources for Multi-TTI Scheduling

It may be regulated that HARQ-ACK resources for PDSCHs scheduled by multi-TTI scheduling DCI are determined as follows.

Alt 1: A HARQ-ACK resource for a specific one of a plurality of scheduled TTIs may be indicated by multi-TTI scheduling DCI, and HARQ-ACK resources for the remaining scheduled TTIs may be implicitly determined. For example, HARQ-ACK resource for the first of the plurality of scheduled TTIs may be determined by the lowest CCE index of the multi-TTI scheduling DCI or according to specific resources associated with a specific state of an A/N resource indicator (ARI), and HARQ-ACK resources for the remaining scheduled TTIs may be determined to be resources to which an offset from the determined resources is applied.

Here, the offset (or a set of offsets to be applied to the plurality of respective TTIs) may be 0, and may be a pre-configured value according to the indexes of the scheduled TTIs and/or information about which ones are the scheduled TTIs. Alternatively, the offset (or the set of offsets to be applied to the plurality of respective TTIs) may be indicated/configured by DCI or higher-layer signaling. In a more specific example, it may be regulated that, when the index of a PUCCH resource for the first scheduled TTI is m, the indexes of PUCCH resources for the second and third scheduled TTIs are determined to be m+1 and m+2, respectively.

Alt 2: HARQ-ACK resource information for a plurality of TTIs may be pre-configured for the respective states of an ARI, and PUCCH resource(s) for scheduled TTI(s) may be determined by a specific state of the ARI indicated in multi-TTI scheduling DCI. For example, for each state of the ARI, PUCCH resources corresponding to a maximum number of TTIs that may be scheduled by multi-TTI scheduling are configured. It may be regulated that, when multi-TTI scheduling DCI schedules fewer TTIs than the number, as many PUCCH resources as the number of scheduled TTIs are used among the PUCCH resources corresponding to the indicated state of the ARI.

PDCCH Blind Decoding (BD) in Case of Multi-TTI Scheduling

It may be regulated that a PDCCH RB set for monitoring multi-TTI scheduling DCI is separately configured. Alternatively, it may be regulated that an aggregation level (AL) and/or the number of BD candidates (or a reduction factor of BD candidates) for monitoring multi-TTI scheduling DCI is independently configured for each PDCCH RB set. Characteristically, this may be distinguished from that for monitoring single-TTI scheduling DCI. Alternatively, among parameters in a PDCCH RB set, it may be indicated whether multi-TTI scheduling is enabled by higher-layer signaling.

Use of Unused Resources

To reduce control overhead, use of resources other than those used for control channels for data channel transmission may be allowed to thereby maximize the utilization of unused resources. To this end, various schemes are being considered, and when multi-TTI scheduling is applied, it may also be desirable to configure maximum utilization of unused resources.

Characteristically, it may be regulated that among a plurality of TTIs scheduled by multi-TTI scheduling DCI, rate-matching of data is allowed in an RB or RBG indicated by a specific (or every) PDCCH RB set in a TTI that does not include the DCI. Regarding the above configuration, one configuration may be commonly applied to a plurality of TTIs to which multi-TTI scheduling has been applied, and a different configuration may be applied to each of the plurality of TTIs. This may be useful when multi-TTI scheduling has been performed and scheduling pre-emption is not allowed for a plurality of scheduled TTIs.

Signaling of TTI which is not Multi-TTI-Scheduled

Multi-TTI scheduling DCI may indicate whether some or all of a plurality of TTIs in a specific period have been scheduled, and it may be regulated that a UE does not monitor a TTI indicated as not scheduled. Alternatively, it may be regulated that when TTIs scheduled by multi-TTI scheduling DCI are indicated by higher-layer signaling, a UE does not monitor DCI in a TTI that does not include the multi-TTI scheduling DCI among the plurality of scheduled TTIs.

Configuration of TTI for Transmission of CSI Report or SRS Among Multiple TTIs

When multi-TTI scheduling is applied based on the proposed method or any other method, it may be necessary to configure a TTI time point corresponding to a CSI request and an SRS request in multi-TTI scheduling DCI (e.g., a transmission time of a PUSCH including an aperiodic CSI feedback). Characteristically, the TTI time point may be configured to be the first or last TTI including a DMRS among a plurality of scheduled TTIs, a pre-configured TTI, or a TTI indicated by DCI. This may allow CSI reporting only when the DMRS exists in the corresponding TTI, for reliable transmission of the triggered CSI.

Alternatively, the TTI time point may be configured to be the first or last TTI without a DMRS among a plurality of scheduled TTIs, a pre-configured TTI, or a TTI indicated by DCI. Because rate matching caused by CSI may increase the coding rate of a PUSCH transmission, a CSI report may be included in a TTI without a DMRS to reduce the coding rate increase.

In another method, it may be regulated that a CSI report is repeatedly included in some (or all) of a plurality of scheduled TTIs. This may further increase the reliability of CSI.

SRS Transmission TTI

When multi-TTI scheduling is applied based on the proposed method or any other method, it may be necessary to configure a TTI time point corresponding to an SRS request in multi-TTI scheduling DCI (e.g., a transmission time of an aperiodic SRS), and an SRS may be transmitted in the last TTI belonging to an SRS subframe among a plurality of scheduled TTIs. Alternatively, an SRS transmission TTI (e.g., an SRS sTTI) may be defined separately, and if there is an SRS transmission TTI among a plurality of scheduled TTIs, an SRS may be transmitted in the SRS transmission TTI.

HARQ-ACK Transmission TTI

When multi-sTTI scheduling is performed, an HARQ-ACK may be transmitted at an HARQ-ACK timing corresponding to each sPDSCH, and alternatively an aggregated and/or bundled HARQ-ACK for multi-sTTI sPDSCHs may be transmitted. Alternatively, one of the two methods may be configured by the network. In the former case, PUCCH/UCI overhead may increase despite fast HARQ-ACK response, whereas in the latter case, latency may increase. Further, when one TB is mapped to multi-sTTI scheduling, it may be assumed that the timing of an HARQ-ACK is configured based on the last sTTI, and that the HARQ-ACK is transmitted in a corresponding PUCCH/UCI resource at the timing. Further, an HARQ-ACK scheme may be associated with a retransmission. Even though multi-sTTI scheduling is performed, only some of TBs may be retransmitted by single-sTTI scheduling. Even for a retransmission, multi-sTTI scheduling may be used, but a subset of initially transmitted TBs may be transmitted at the retransmission. That is, it may be assumed that only a TB corresponding to NACK or DTX is transmitted at a retransmission. If a retransmission is scheduled in a single sTTI, or if single-sTTI DCI and multi-sTTI DCI may coexist, it may be assumed that a DCI size is adjusted using padding or the like, and an indication regarding a single sTTI or multiple sTTIs may be added to corresponding DCI. Alternatively, a DCI size may be configured for each PRB set to separately transmit multiple sTTIs and a single sTTI.

Cross-Carrier Scheduling

When it is possible to configure an independent (different) processing time for each cell, there may be a need for a rule between an eNB and a UE, for deriving a processing time in the case of cross-carrier scheduling. For example, when processing time configurations of a scheduling cell and a scheduled cell indicate different processing times, the UE may face ambiguity in determining which processing time is to be taken to determine a DL allocation-to-DL data processing time and/or a DL data-to-DL HARQ processing time and/or a UL grant-to-UL data processing time. Accordingly, it may be regulated that only when the processing time configurations of a scheduling cell and a scheduled cell indicate the same processing time, cross-carrier scheduling is allowed.

Cross-carrier scheduling is defined as follows in the current LTE standard (TS 36.331).

CrossCarrierSchedulingConfig

The IE CrossCarrierSchedulingConfig is used to specify the configuration when the cross carrier scheduling is used in a cell.

CrossCarrierSchedulingConfig information elements

```
ASN1START
CrossCarrierSchedulingConfig-r10 ::=    SEQUENCE {
    schedulingCellInfo-r10                  CHOICE {
        own-r10                                 SEQUENCE {
            -- No cross carrier scheduling
            cif-Presence-r10                        BOOLEAN
        },
        other-r10                               SEQUENCE {
            -- Cross carrier scheduling
            schedulingCellId-r10                    ServCellIndex-r10,
            pdsch-Start-r10                         INTEGER (1..4)
        }
    }
}
ASN1STOP
```

TABLE 5

CrossCarrierSchedulingConfig field descriptions cif-Presence

The field is used to indicate whether carrier indicator field is present (value TRUE) or not (value FALSE) in PDCCH/EPDCCH DCI formats, see TS 36.212 [22, 5.3.3.1].

pdsch-Start

The starting OFDM symbol of PDSCH for the concerned SCell, see TS 36.213 [23. 7.1.6.4]. Values 1, 2, 3 are applicable when dl-Bandwidth for the concerned SCell is greater than 10 resource blocks, values 2, 3, 4 are applicable when dl-Bandwidth for the concerned SCell is less than or equal to 10 resource blocks, see TS 36.211 [21, Table 6, 7-1].

schedulingCellId

Indicates which cell signals the downlink allocations and uplink grants, if applicable, for the concerned SCell. In case the UE is configured with DC, the scheduling cell is part of the same cell group (i.e. MCG or SCG) as the scheduled cell.

The above cross-carrier scheduling-related configuration (e.g., scheduling cell information, PDSCH starting symbol information, and so on) may be configured for or applied to the UE regardless of a processing time-related configuration. In this case, a scheduling cell and a scheduled cell may have different processing times, and a related UE operation needs to be defined. In this case, for example, the UE may take the longer between the two processing times as its DL allocation-to-DL data and/or DL data-to-DL HARQ and/or UL grant-to-UL data processing time in order to secure a conservative processing time margin.

Alternatively, the cross-carrier scheduling-related configuration may be interpreted differently by the processing time-related configuration of the scheduled cell. For example, even though cross-carrier scheduling is configured for a specific scheduled cell, when the processing time of the scheduled cell is configured to be different from the processing time of a cell that schedules the corresponding cell (e.g., the processing time of the scheduled cell is n+3, and the processing time of the scheduling cell is n+4), only self-carrier scheduling, not cross-carrier scheduling is applied to the scheduled cell. Accordingly, it may be regulated that the UE monitors DL assignment/UL grant DCI for the scheduled cell in a search space configured in the scheduled cell.

Alternatively, when a short processing time is configured for a specific cell, a cross-carrier scheduling-related configuration may also be configured separately. Characteristically, even though cross-carrier scheduling of a specific cell is originally enabled, the cross-carrier scheduling may be disabled along with the configuration of the short processing time. Alternatively, a scheduling cell and/or a PDSCH starting symbol indicated by a cross-carrier scheduling-related configuration of the specific cell, and a scheduling cell and/or a PDSCH starting symbol configured by the configuration of a short processing time may be indicated to be different.

If cross-carrier scheduling by serving cell Y is configured for a data channel to be transmitted in serving cell X and sTTI is configured for serving cell X, the UE may monitor a PDCCH/EPDCCH of serving cell Y for a data channel of a subframe duration to be transmitted in serving cell X, and monitor a PDCCH/SPDCCH of serving cell X for a data channel of a slot/subslot duration to be transmitted in serving cell X.

As such, monitoring control channels in a plurality of serving cells, for data channels having different durations to be transmitted in one cell, may not be preferable because it may affect the processing time of the UE. Therefore, the following operations are proposed for a UE receiving the above configuration.

Option 1: In order to reduce the effect on the processing time of the UE, it may be regulated that only self-carrier scheduling is supported regardless of the duration of a data channel. In other words, the UE monitors, only in serving cell X, control channels that schedule data channels to be transmitted in serving cell X. This may be interpreted as the UE ignoring a cross-carrier scheduling configuration. Characteristically, for a data channel to be transmitted in serving cell X, the UE may monitor only a PDCCH and/or SPDCCH, except for an EPDCCH, in serving cell X.

Option 2: It may be regulated that a UE capability is reported, regarding whether the UE supports monitoring of control channels in a plurality of serving cells, for data channels having different durations to be transmitted in one cell. That is, the UE may report its capability as to whether the UE supports simultaneous monitoring of a PDCCH/EPDCCH that schedules a subframe-PDSCH/PUSCH in cell Y and a PDCCH/SPDCCH that schedules a slot/subslot-PDSCH/PUSCH in cell X. It may be regulated that, if the UE reports that the operation is supported, the subframe-PDSCH/PUSCH is scheduled by cross-carrier scheduling and the slot/subslot-PDSCH/PUSCH is scheduled by self-carrier scheduling, and the UE monitors each control channel in a corresponding cell. It may be regulated that, if the operation is reported as unsupportable, all data channels having different durations are operated by self-carrier scheduling as in option 1 and accordingly, the UE monitors the control channels in the corresponding cells.

The monitoring operation may be applied to an operation of monitoring a plurality of control channels, for data channels having different durations, even though time periods in which the plurality of control channels are actually monitored, for the data channels having different durations, do not overlap with each other.

Option 3: For data channels having different durations to be transmitted in one cell (herein, a duration includes a TTI length), the UE does not expect that cross-carrier scheduling is configured for a data channel having any one duration. In other words, it may be regulated that only self-carrier scheduling is configured for data channels of all durations/TTI lengths/numerologies/target BLERs configured (or supported) in a specific cell. The specific cell may include a cell for which a different duration/TTI length/numerology/target BLER is configured or pre-configured. This configuration may be applied regardless of the capability of simultaneously receiving a plurality of data channels having different durations.

Option 4: In another method, as regards data channels having different durations to be transmitted in one cell (herein, a duration includes a TTI length), it may be regulated that, for a data channel of a specific duration (e.g., a subframe-PDSCH) of a specific cell, self-carrier scheduling, or cross-carrier scheduling from a cell for which no EPDCCH is configured, is configured. That is, it may be regulated that for a data channel of a specific duration (e.g., a subframe-PDSCH) of a specific cell, the UE monitors a control channel in the cell, or monitors only a control channel (e.g., a PDCCH) other than an EPDCCH when cross-carrier scheduling is performed in another cell. The specific cell may be a cell for which a different duration/TTI length/numerology/target BLER is configured or pre-configured. This configuration may be applied regardless of the capability of simultaneously receiving multiple data channels with different durations/TTI lengths/numerologies/target BLERs.

The monitoring operation may be applied to an operation of monitoring a plurality of control channels for data channels having different durations, even though time periods in which the plurality of control channels are actually monitored for the data channels having different durations/TTI lengths/numerologies/target BLERs do not overlap with each other.

Dynamic Fallback to Transmit Diversity

An sTTI operation is an operation configured to reduce latency according to a UE capability that a UE has reported to the network in an RRC Connected mode. In order to prevent an excessive increase in the BDs of an (S)PDCCH at the UE, a DCI format for fallback transmission is not separately defined in the sTTI operation. It may be regulated that, if the eNB wants to perform fallback to a transmission scheme such as transmit diversity due to a change in a channel state, the fallback is indicated to the UE by using (reusing) a specific field in a DCI format that the UE monitors according to a transmission mode (TM) defined and configured by TM-dependent DCI. Thus, the UE may dynamically fall back from a transmission scheme based on the configured TM to the transmit diversity transmission scheme to expect a higher reception rate for a DL data channel. In the sTTI operation, if dynamic fallback is not supported, the eNB should always perform scheduling by using the legacy/default TTI (e.g., a 1-ms TTI) when it wants to fall back to a transmission scheme such as transmit diversity, which may cause a high DL latency.

It may be regulated that for the sTTI operation, a UE reports a UE capability as to whether the UE supports dynamic fallback to a specific transmission scheme (e.g., transmit diversity) to the network by signaling. Characteristically, the UE capability signaling may be independently defined for each TTI length (or each TTI group including a plurality of TTI lengths). This is because whether the UE supports dynamic fallback to the transmit diversity transmission scheme may be different for each TTI length. Further, a configuration of the eNB or the network that performs dynamic fallback to a specific transmission scheme (e.g., transmit diversity) may be independently configured for each TTI length (or a TTI length group including a plurality of TTI lengths) by higher-layer signaling.

Additionally or alternatively, the UE capability signaling may include information about the number of supported antenna ports. For example, it may be reported that only 2-port transmit diversity is supported, or both 2-port transmit diversity and 4-port transmit diversity are supported. Further, the configuration of the eNB or network that performs dynamic fallback to a specific transmission scheme (e.g., transmit diversity) may include information about the number of antenna ports and may be configured by higher-layer signaling.

The UE capability signaling may be independently defined for each TM (or each TM group including a plurality of TMs) configured for the sTTI operation. Whether or not dynamic fallback is support may be different in each TM configured for the UE, and the eNB may determine whether to perform the dynamic fallback in an sTTI based on the UE capability signaling. Further, a DCI field for dynamic fallback may also be interpreted differently based on the UE capability signaling (and/or the configuration of the eNB or network to enable/disable dynamic fallback). Alternatively, regardless of a TM configured for the sTTI operation, common UE capability signaling may be defined, which may be interpreted as always supporting fallback to the transmit diversity transmission scheme, if the UE supports the sTTI operation. The eNB may also be capable of performing transmit diversity irrespective of a configured TM, thereby avoiding unnecessary latency. Further, the configuration of the eNB or the network that performs dynamic fallback to a specific transmission scheme (e.g., transmit diversity) may be configured irrespective of a TM configured for a sTTI or independently for each TM (group) configured for the sTTI by higher-layer signaling.

Since examples of the above proposed methods may be included as one of methods of implementing the present disclosure, it is apparent that the examples may be regarded as proposed methods. Further, the foregoing proposed methods may be implemented independently, or some of the methods may be implemented in combination (or merged). Further, it may be regulated that information indicating whether the proposed methods are applied (or information about the rules of the proposed methods) is indicated to a UE by a pre-defined signal (or a physical-layer or higher-layer signal) by an eNB.

Figure 9:
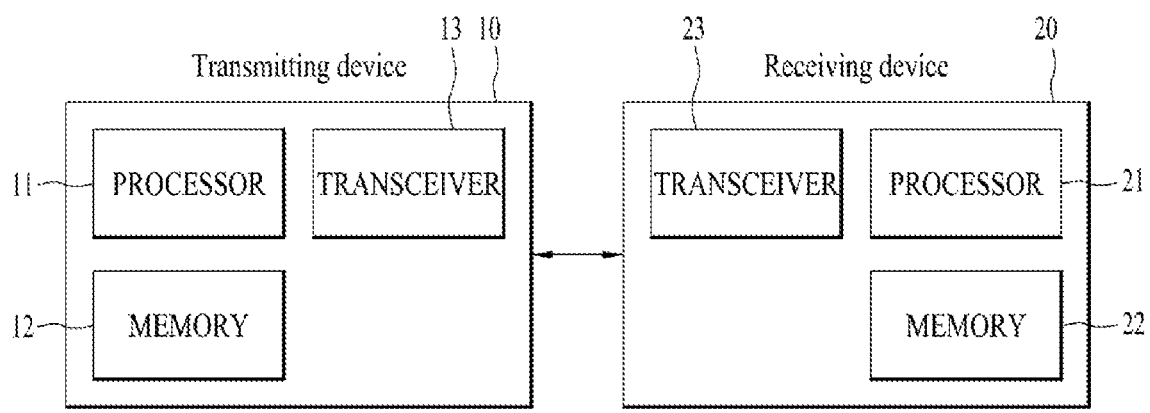
FIG. 9 is a block diagram of devices for implementing the embodiment(s) of the present disclosure.

FIG. 9 is a block diagram illustrating elements of a transmitting device 10 and a receiving device 20 for implementing the present disclosure. The transmitting device 10 and the receiving device 20 respectively include transceivers 13 and 23 capable of transmitting and receiving radio signals carrying information, data, signals, and/or messages, memories 12 and 22 for storing information related to communication in a wireless communication system, and processors 11 and 21 operationally connected to elements such as the transceivers 13 and 23 and the memories 12 and 22 to control the elements and configured to control the memories 12 and 22 and/or the transceivers 13 and 23 so that a corresponding device may perform at least one of the above-described examples of the present disclosure.

The memories 12 and 22 may store programs for processing and controlling the processors 11 and 21 and may temporarily store input/output information. The memories 12 and 22 may be used as buffers. The processors 11 and 21 generally control the overall operation of various modules in the transmitting device and the receiving device. Especially, the processors 11 and 21 may perform various control functions to implement the present disclosure. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present disclosure is implemented using firmware or software, the firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the transceiver 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transceiver 13 may include an oscillator. The transceiver 13 may include $N_t$ (where $N_t$ is a positive integer) transmit antennas.

A signal processing process of the receiving device 20 is the reverse of the signal processing process of the transmitting device 10. Under control of the processor 21, the transceiver 23 of the receiving device 20 receives radio signals transmitted by the transmitting device 10. The transceiver 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The transceivers 13 and 23 include one or more antennas. An antenna performs a function for transmitting signals processed by the transceivers 13 and 23 to the exterior or receiving radio signals from the exterior to transfer the radio signals to the transceivers 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. A transceiver supporting a MIMO function of transmitting and receiving data using a plurality of antennas may be connected to two or more antennas.

In the examples of the present disclosure, a terminal or UE operates as the transmitting device 10 in UL and as the receiving device 20 in DL. In the examples of the present disclosure, a BS or eNB operates as the receiving device 20 in UL and as the transmitting device 10 in DL.

The transmitting device and/or the receiving device may implement at least one or more of the foregoing examples of the present disclosure in combination.

In one of the combinations of the proposals, a terminal for receiving downlink signals in a wireless communication includes a receiver, a transmitter, and a processor. The processor may receive, from a base station, a configuration of dynamic change to a predetermined transmission scheme related to a short transmission time interval (sTTI)-based downlink operation, when receiving the configuration of the dynamic change, detect a downlink control information format including a field related to the dynamic change, and when a value of the field indicates the predetermined transmission scheme, receive signals on a downlink data channel according to the predetermined transmission scheme.

The configuration of the dynamic change may be configured per TTI length. Further, the configuration of the dynamic change may be configured irrespective of a transmission mode related to the sTTI-based downlink operation.

The predetermined transmission scheme may be transmit diversity.

Further, the processor may report, to the base station, a terminal capability as to whether the dynamic change to the predetermined transmission scheme is supported. The terminal capability reporting may be defined per TTI length.

Further, the downlink control information format may schedule downlink data channels in a plurality of TTIs, and HARQ-ACK responses for the downlink data channels in the plurality of TTIs may be transmitted individually at timings corresponding to the respective downlink channels in the plurality of TTIs.

Further, the downlink control information format may schedule the downlink data channels in the plurality of TTIs, and the HARQ-ACK responses for the downlink channels in the plurality of TTIs may be transmitted by bundling or aggregation.

Further, the HARQ-ACK responses may be transmitted in resources determined by a lowest CCE index of the downlink control information format or resources spaced from resources linked to states of an ARI field by a predetermined offset.

Further, a resource block set for monitoring the downlink control information format, an aggregation level to be used in the resource block set for monitoring the downlink control information format, and/or the number of monitoring candidates may be configured.

As described above, the detailed description of the preferred examples of the present disclosure has been given to enable those skilled in the art to implement and practice the disclosure. Although the disclosure has been described with reference to exemplary examples, those skilled in the art will appreciate that various modifications and variations can be made in the present disclosure described in the appended claims. Accordingly, the disclosure should not be limited to the specific examples described herein, but should be accorded the broadest scope consistent with the principles and novel features disclosed herein.

INDUSTRIAL APPLICABILITY

The present disclosure is applicable to wireless communication devices such as a terminal, a relay, a BS and the like.

The invention claimed is:
1. A method for wireless communication by a terminal supporting a short transmission time interval (sTTI), the method comprising:
    receiving, through higher layer signaling, configuration related to a dynamic transmission-diversity (Tx-D) fallback operation for the terminal configured with a sTTI-based operation;
    receiving a specific format of downlink control information (DCI) including a specific field set to one of a plurality of values including at least one value for the terminal to perform the dynamic Tx-D fallback operation; and
    performing the dynamic Tx-D fallback operation based on the specific field of the DCI and the higher layer signaled configuration.
2. The method according to claim 1, wherein the configuration regarding the dynamic Tx-D fallback operation is common configuration for a group of transmission modes (TMs) related to the sTTI-based operation.
3. The method according to claim 1, further comprising:
    transmitting terminal capability information for reporting to a network that the dynamic Tx-D fallback operation is supported by the terminal.
4. The method according to claim 1, wherein receiving the specific format of the DCI comprises:
    obtaining first information for the dynamic Tx-D fallback operation based on the specific field, second information regarding scheduling a wireless communication signal in a plurality of sTTIs, and third information regarding hybrid automatic repeat request (HARD) related information for the wireless communication signal.
5. The method according to claim 1, wherein the specific format of the DCI is transmission mode (TM)-specific DCI.
6. The method according to claim 5, wherein in the reception of the DCI:
    in a case where the terminal is configured with a first TM, the terminal receives the DCI by assuming that the specific format of the DCI is related to a first format, and
    in a case where the terminal is configured with a second TM, the terminal receives the DCI by assuming that the specific format of the DCI is related to a second format.
7. The method according to claim 1, wherein the specific field is an existing field of the DCI, the existing field being reused for indicating the dynamic Tx-D fallback operation to the terminal configured with the higher layer signaled configuration.
8. The method according to claim 1,
    wherein in a case where the configuration for the dynamic Tx-D fallback operation is related to first configuration, the terminal interprets a value of the specific field as an indication of a first parameter for a first Tx-D fallback operation, and
    wherein in a case where the configuration for the dynamic Tx-D fallback operation is related to second configuration, the same value of the specific field is interpreted as an indication of a second parameter for a second Tx-D fallback operation.

9. The method according to claim 8, wherein the first configuration is configured to support two antenna ports, and the second configuration is configured to support four antenna ports.

10. The method according to claim 8, wherein the first parameter and the second parameter are related to antenna port information, respectively.

11. The method according to claim 1, wherein a length of a single transmission time interval (TTI) is 1 millisecond (ms) and a length of a single sTTI is less than 1 ms.

12. The method according to claim 1, wherein the sTTI is related to a subslot, and a transmission time interval (TTI) is related to a subframe.

13. The method according to claim 1, wherein the terminal supports a transmission time interval (TTI)-based operation in addition to the sTTI-based operation.

14. The method according to claim 1, wherein the performing of the dynamic Tx-D fallback operation is relate to reception of downlink data through a downlink data channel.

15. The method according to claim 1, wherein the terminal receives the DCI by performing blind decoding of a sTTI-based physical downlink control channel (sPDCCH).

16. The method according to claim 1, wherein the specific field is interpreted based on the higher layer signaled configuration.

17. A non-transitory processor readable medium recorded thereon at least one program code for executing the method of claim 1.

18. A wireless communication terminal comprising:
a receiver;
a transmitter; and
at least one processor operably connected with the receiver and the transmitter,
wherein the at least one processor is configured to:
receive, via the receiver through higher layer signaling, configuration related to a dynamic transmission-diversity (Tx-D) fallback operation for the terminal configured with a short transmission time interval (sTTI)-based operation;
receive, via the receiver, a specific format of downlink control information (DCI) including a specific field set to one of a plurality of values including at least one value for the terminal to perform the dynamic Tx-D fallback operation; and
perform the dynamic Tx-D fallback operation based on the specific field of the DCI and the higher layer signaled configuration.

19. A method for wireless communication by a base station supporting a short transmission time interval (sTTI), the method comprising:
transmitting, through higher layer signaling, configuration related to a dynamic transmission-diversity (Tx-D) fallback operation for a terminal configured with a sTTI-based operation;
generating specific format of downlink control information (DCI) including a specific field which is set to one of a plurality of values including at least one value for the dynamic Tx-D fallback operation; and
performing, based on the DCI, the dynamic Tx-D fallback operation by processing a wireless communication signal,
wherein the generation of the DCI comprises:
determining a value of the specific field of the DCI based on information to be used for the dynamic Tx-D fallback operation and the higher layer signaled configuration.

20. A non-transitory processor readable medium recorded thereon at least one program code for executing the method of claim 19.

* * * * *